(12) United States Patent
Isono

(10) Patent No.: US 7,389,992 B2
(45) Date of Patent: Jun. 24, 2008

(54) GASKET FOR HARD DISC DRIVE HAVING COMPRESSIBLE LIP AND EXTENSION PORTION AT SCREW FIXING/INFLECTION PORTIONS

(75) Inventor: Eiji Isono, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/519,463

(22) PCT Filed: Jul. 15, 2003

(86) PCT No.: PCT/JP03/08980

§ 371 (c)(1),
(2), (4) Date: Dec. 29, 2004

(87) PCT Pub. No.: WO2004/018906

PCT Pub. Date: Mar. 4, 2004

(65) Prior Publication Data

US 2006/0049585 A1    Mar. 9, 2006

(30) Foreign Application Priority Data

Aug. 20, 2002 (JP) .............................. 2002-239609

(51) Int. Cl.
*F16J 15/10* (2006.01)
(52) U.S. Cl. ........................................ 277/637; 277/644
(58) Field of Classification Search ................ 277/628, 277/630, 637, 644, 648, 638, 639; 360/97.02
See application file for complete search history.

(56) References Cited

U.S. PATENT DOCUMENTS

| | | | | |
|---|---|---|---|---|
| 2,717,793 A | * | 9/1955 | Nenzell | 277/611 |
| 3,061,321 A | * | 10/1962 | Smith | 277/637 |
| 3,333,725 A | * | 8/1967 | Hirata et al. | 220/226 |
| 3,510,139 A | * | 5/1970 | Potter | 277/603 |
| 4,254,960 A | * | 3/1981 | Jelinek | 277/644 |
| 4,321,225 A | * | 3/1982 | Jelinek | 264/138 |
| 5,002,290 A | * | 3/1991 | Pernin | 277/649 |
| 5,551,705 A | * | 9/1996 | Chen et al. | 277/648 |
| 5,568,341 A | | 10/1996 | Shikano | 360/97 |
| 6,305,695 B1 | * | 10/2001 | Wilson | 277/584 |
| 6,619,667 B2 | * | 9/2003 | Kawaguchi et al. | 277/628 |
| 6,623,684 B1 | * | 9/2003 | Satoh et al. | 264/267 |

(Continued)

FOREIGN PATENT DOCUMENTS

JP    05-326731    12/1993

(Continued)

*Primary Examiner*—Richard E. Chilcot
*Assistant Examiner*—Gay Ann Spahn
(74) *Attorney, Agent, or Firm*—Jacobson Holman PLLC

(57) ABSTRACT

A gasket structured such that a packing is firmly fixed to one surface of a plate with a predetermined plane arrangement. The structure is made such that the packing is firmly fixed to one surface of the plate with a predetermined plane arrangement. The plate is screwed to an opposing assembly member at a screw fixing portion at a time of assembling. The packing is bent to one side in a width direction by being compressed at a lip portion by the opposing assembly member. A packing extension portion for partly enlarging an adhesive bonding area of the packing to the plate is provided in a position close to the screw fixing portion, an inflection portion or a position close thereto in a plane shape of the packing.

3 Claims, 7 Drawing Sheets

U.S. PATENT DOCUMENTS

| | | |
|---|---|---|
| 6,769,699 B2 * | 8/2004 | Seki et al. .................. 277/628 |
| 6,837,498 B2 * | 1/2005 | Fluck et al. ................. 277/630 |
| 2002/0190484 A1 * | 12/2002 | Seki et al. .................. 277/628 |
| 2004/0075224 A1 * | 4/2004 | Kuroki et al. ............... 277/650 |
| 2005/0225039 A1 * | 10/2005 | Seki et al. .................. 277/637 |
| 2005/0253342 A1 * | 11/2005 | Hampton .................. 277/628 |
| 2005/0253343 A1 * | 11/2005 | Hampton .................. 277/628 |
| 2006/0074170 A1 * | 4/2006 | Kojima et al. .............. 524/474 |
| 2006/0131819 A1 * | 6/2006 | Kurano et al. ............... 277/628 |

FOREIGN PATENT DOCUMENTS

| | | |
|---|---|---|
| JP | 07-211044 | 8/1995 |
| JP | 09-282860 | 10/1997 |
| JP | 2000-100125 | 4/2000 |
| JP | 2001-254832 | 9/2001 |
| JP | 2001-311470 | 11/2001 |
| JP | 2003-049949 | 2/2003 |

* cited by examiner

PRIOR ART

PRIOR ART

US 7,389,992 B2

GASKET FOR HARD DISC DRIVE HAVING COMPRESSIBLE LIP AND EXTENSION PORTION AT SCREW FIXING/INFLECTION PORTIONS

This is a nationalization of PCT/JP03/08980 filed July 15, 2003 and published in Japanese.

FIELD OF THE INVENTION

The present invention relates to a gasket corresponding to one kind of a sealing apparatus, and more particularly to a gasket having a structure in which a packing is adhered to a plate. The gasket in accordance with the present invention is used, for example, as a cover gasket for electronic equipment such as a hard disc device or the like, or as other industrial gaskets.

BACKGROUND ART

A cover gasket 51 for a hard disc device (HDD) is structured, as shown in FIG. 5, such that a packing 53 made of a rubber-like elastic material is firmly fixed to one surface of a cover plate 52 made of a metal with a predetermined plane arrangement in accordance with an adhesive bonding means, a baking means or the like. In particular, the cover gasket 51 for a compact hard disc device is structured such that a cross sectional shape of the packing 53 is formed in an asymmetrical shape in view of a width direction (a lateral direction on the drawing), as shown in FIG. 6, and a lip portion 54 is compressed by the opposing base plate 55 at a time of assembling a product as shown in FIG. 7 so as to be bent to an inner peripheral side (a left side on the drawing), thereby securing a dustproof property and an airtightness.

However, in accordance with the conventional cover gasket 51, since a round shape and a compression rate of the packing 53 are set comparatively larger in a position close to a screw fixing portion 56 fixing the cover plate 52 to the opposing base plate 55 by screw than those in the other positions, there is a disadvantage that the packing 53 tends to be peeled off from the cover plate 52 due to an influence of a bending moment (an arrow M) or the like caused by a compression.

Further, there is a disadvantage that the packing 53 tends to be peeled off from the cover plate 52 in a bent portion in which the packing 53 is bent or curved or crossed in a plane shape thereof in the same manner, in addition to the screw fixing portion 56.

The present invention is made by taking the points mentioned above into consideration, and an object of the present invention is to provide a gasket in which a packing is adhered to one surface of a plate with a predetermined plane arrangement, wherein the gasket has a structure in which the packing is hard to be peeled off from the plate to which the packing is firmly fixed.

SUMMARY OF THE INVENTION

In order to achieve the object mentioned above, in accordance with a first aspect of the present invention, there is provided a gasket, wherein a packing closely contacted with an opposing assembling member is adhered to one surface of a plate assembled in the opposing assembling member with a predetermined plane arrangement, the plate is screwed to the opposing assembly member in a screw fixing portion at a time of assembling, the packing is bent to one side in a width direction by being compressed in a lip portion by the opposing assembly member, a packing extension portion for partly enlarging an adhesive bonding area of the packing to the plate is provided in a position close to the screw fixing portion, an inflection portion of a position close thereto in a plane shape of the packing closely contacted with the opposing assembling member, and the packing extension portion is adhered to the one surface of the plate together with the packing.

In accordance with a second aspect of the present invention, there is provided a gasket, wherein a packing closely contacted with an opposing assembling member is adhered to one surface of a plate assembled in the opposing assembling member with a predetermined plane arrangement, the packing is bent to one side in a width direction by being compressed in a lip portion by the opposing assembly member, a packing extension portion for partly enlarging an adhesive bonding area of the packing to the plate is provided in an inflection portion or a position close thereto in a plane shape of the packing closely contacted with the opposing assembling member, and the packing extension portion is adhered to the one surface of the plate together with the packing.

In accordance with a third aspect of the present invention, there is provided a gasket, wherein a packing closely contacted with an opposing assembling member is adhered to one surface of a plate assembled in the opposing assembling member with a predetermined plane arrangement, a packing extension portion for partly enlarging an adhesive bonding area of the packing to the plate is provided in an inflection portion or a position close thereto in a plane shape of the packing closely contacted with the opposing assembling member, and the packing extension portion is adhered to the one surface of the plate together with the packing.

In accordance with a fourth aspect of the present invention, there is provided a gasket as recited in any one of the first aspect to the third aspect mentioned above, wherein the gasket is constituted by an integrally formed gasket in which the packing is integrally formed in the plate, and a pouring hole of a gasket forming material of a metal mold at a time of integrally forming the gasket is arranged on the packing extension portion.

In accordance with a fifth aspect of the present invention, there is provided a gasket as recited in any one of the first aspect to the fourth aspect mentioned above, wherein the gasket is used as a cover gasket for electronic equipment.

In the case that the packing extension portion for partly enlarging the adhesive bonding area of the packing to the plate is provided in the position close to the screw fixing portion in the plane shape of the packing or the inflection portion or the position close thereto in the plane shape of the packing, as in the gasket in accordance with the first aspect, the second aspect or the third aspect of the present invention provided with the structure mentioned above, the adhesive bonding area of the packing to the plate is enlarged in the position in which the packing extension portion is provided, and an adhesive force is increased. Accordingly, since the adhesive force of the packing is large even if a comparatively large bending moment or the like is applied to the packing due to a fastening of the screw or the like, the packing is hard to be peeled off from the plate. The inflection portion mentioned above is a position in which the packing is bent or curved or crossed in the plane shape thereof, and there is an instance that it is provided in a position close to the screw fixing portion of the plate and an instance where it is provided in another comparatively far position than the position close to the screw fixing portion.

Since the packing extension portion mentioned above is provided for expanding the adhesive surface of the packing to the plate and increasing the adhesive force as mentioned above, and is provided at the position which is deflected from a seal line of the packing, the packing extension portion itself has no effect on a seal performance of the packing. Accordingly, in the case that the gasket is constituted by the integrally formed gasket in which the packing is integrally formed in the plate, when the pouring hole of the gasket forming material of the metal mold at a time of integrally forming the gasket is arranged on the packing extension portion, as in the gasket in accordance with the fourth aspect of the present invention, even if a pouring hole trace is left in a product, the pouring hole trace has no effect on the seal performance of the packing because the pouring hole trace is arranged at a position which is deflected from the seal line of the packing.

Further, the gasket in accordance with the present invention is used as the cover gasket for electronic equipment such as a hard disc device as mentioned above (the fifth aspect), or other industrial gaskets. However, since the cover gasket for the compact hard disc device is structured such that the cross sectional shape of the packing is formed in an asymmetrical shape in the width direction as mentioned above, the lip portion is compressed by the opposing base plate at a time of assembling the product so as to be bent to one side in the width direction, and the moment is generated at this time, and it is possible to particularly effectively make use of the present invention.

In this case, the following embodiments are included in the present invention.

A. The structure is made such that a rib (a packing extension portion) is added to the cross sectional shape of the conventional packing near the screw portion.

B. The structure is made such that a rib (a packing extension portion) is added to the cross sectional shape of the conventional packing near the inflection portion.

C. A rib (a packing extension portion) protruding in a direction of a cover surface, having an adhesive surface formed as the same surface as the gasket adhesive surface, and having a smaller height than a height of the gasket at a time of compressing the gasket is provided near the screw portion.

D. A rib (a packing extension portion) protruding in a direction of a cover surface, having an adhesive surface formed as the same surface as the gasket adhesive surface, and having a smaller height than a height of the gasket at a time of compressing the gasket is provided near the inflection portion.

E. The rib (the packing extension portion) is structured such that a size in a longitudinal direction of the rib is set to be equal to or more than a width of the gasket contact surface, and a size in a width direction of the gasket is set to be 20% or more of the width size of the gasket contact surface.

F. The packing cross section of the conventional TPE gasket is formed asymmetrically in an inner periphery and an outer periphery, and the screw fixing portion is a position in which a more round shape is provided in comparison with the other positions, and a compression rate is comparatively large. Further, since the TPE and the adhesive agent are constituted by a thermoplastic resin, a binding force of the packing is lowered due to a temperature increase caused by an actuation of the HDD, an adhesion peeling is generated due to the bending moment. Accordingly, it is possible to prevent the peeling caused by the bending moment by arranging the rib (the packing extension portion) at the position, and thereby increasing the adhesive area.

G. The TPE gasket employs a manufacturing method on the basis of a metal fitting integral forming, however, the burr and gate scar generated at a time of forming can be arranged in the outer periphery of the packing which has no effect on the product function, by placing the pouring hole in the rib (the packing extension portion). In other words, the pouring hole is provided on the rib (the packing extension portion).

H. It is possible to prevent concentrated adhesion peeling generated near the screw portion by arranging the rib (the packing extension portion) in the packing of the screw portion on the basis of the structure mentioned above.

I. It is possible to prevent concentrated adhesion peeling generated near the inflection portion by arranging the rib (the packing extension portion) in the packing of the inflection portion on the basis of the structure mentioned above.

J. It is possible to set the pouring hole in accordance with the integrally formed method in the position (the rib), by arranging the rib (the packing extension portion) in the packing of the screw portion on the basis of the structure mentioned above, whereby it is possible to arrange the burr generated at a time of forming so as to have no effect on the product function.

BEST MODE FOR CARRYING OUT THE INVENTION

Next, a description will be given of an embodiment in accordance with the present invention with reference to the accompanying drawings.

Figure 1:
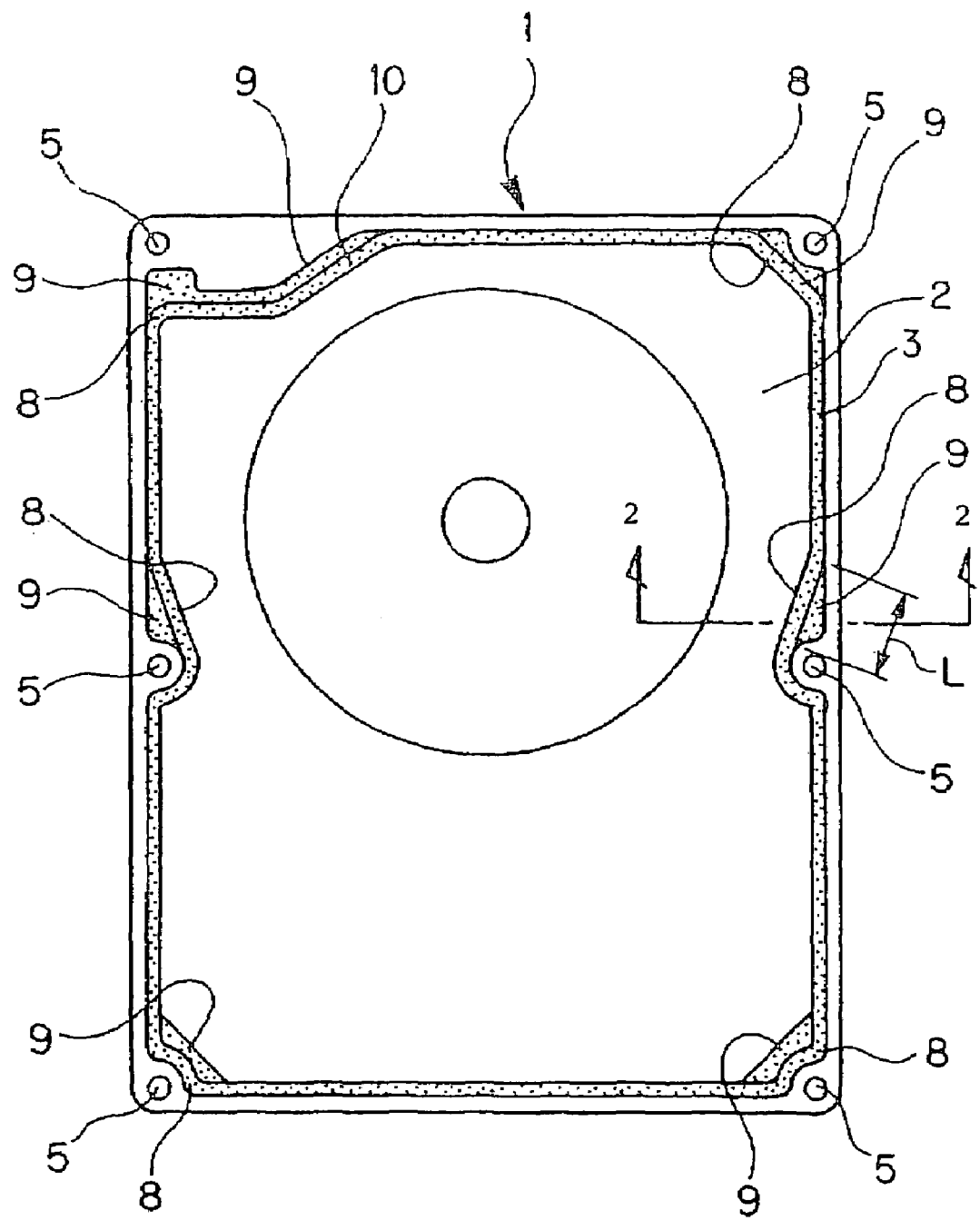
FIG. 1 is a plan view of a gasket in accordance with an embodiment of the present invention.
Figure 2:
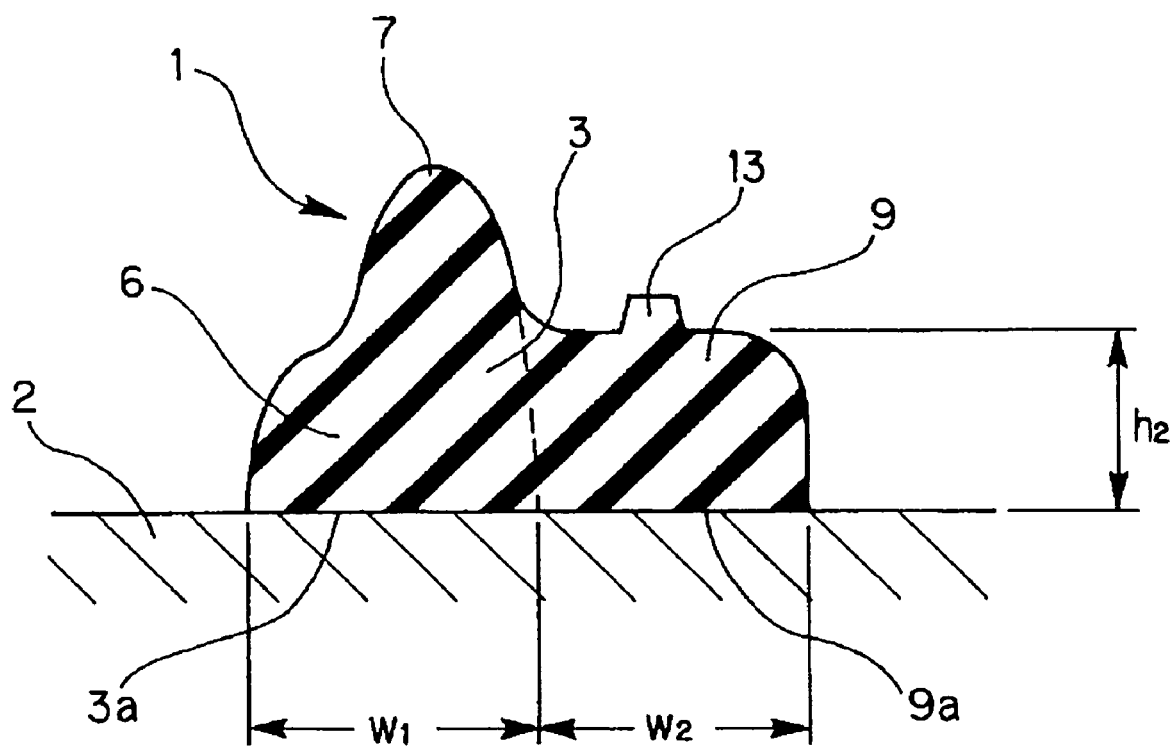
FIG. 2 is a cross sectional view of a main portion of the gasket and an enlarged cross sectional view along a line 2-2 in FIG. 1.
Figure 3:
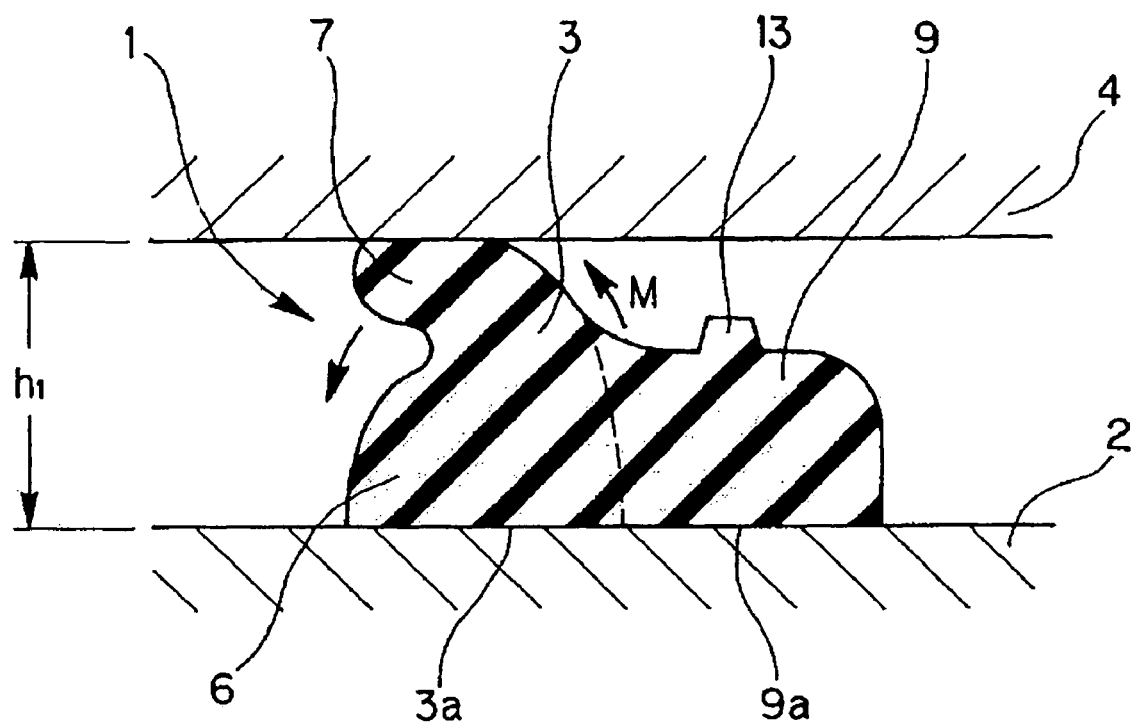
FIG. 3 is a cross sectional view of a main portion showing an assembled state of the gasket.
Figure 4:
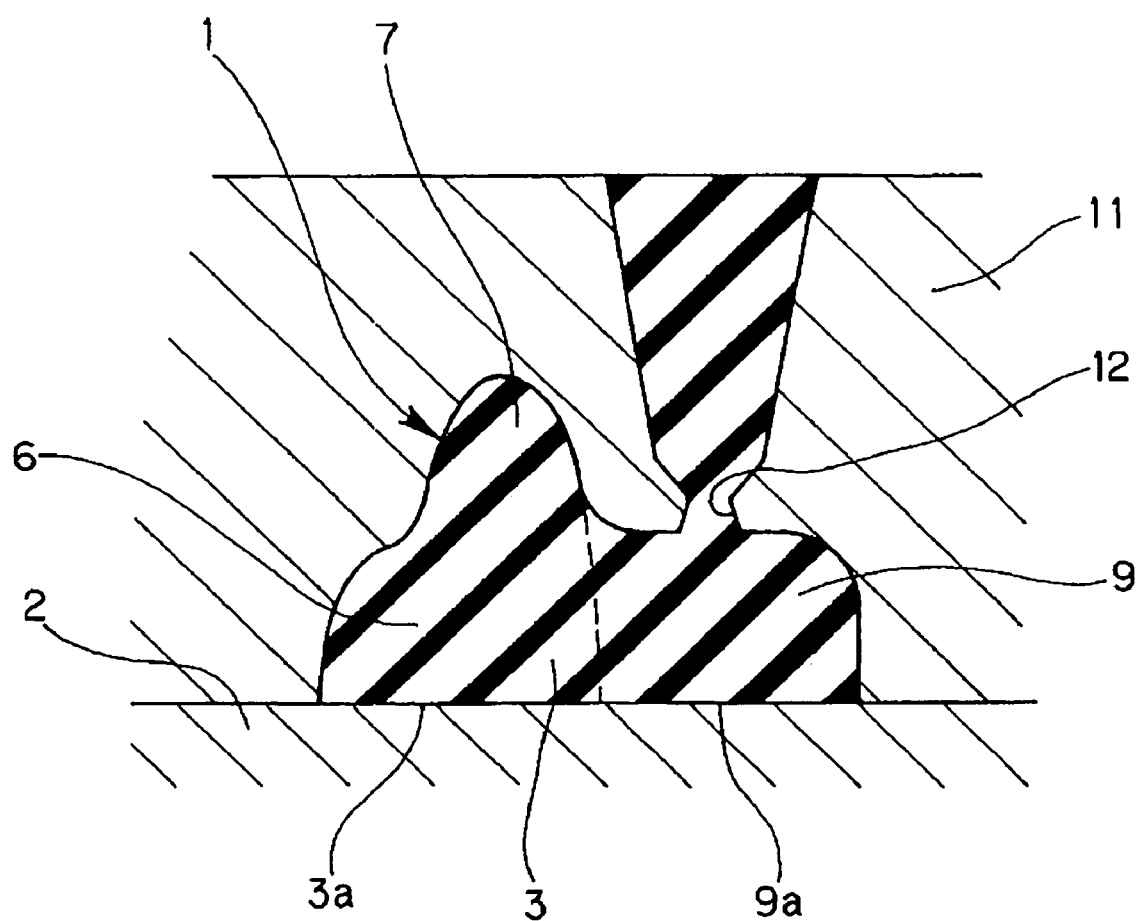
FIG. 4 is a cross sectional view of a main portion showing a manufacturing step of the gasket.
Figure 5:
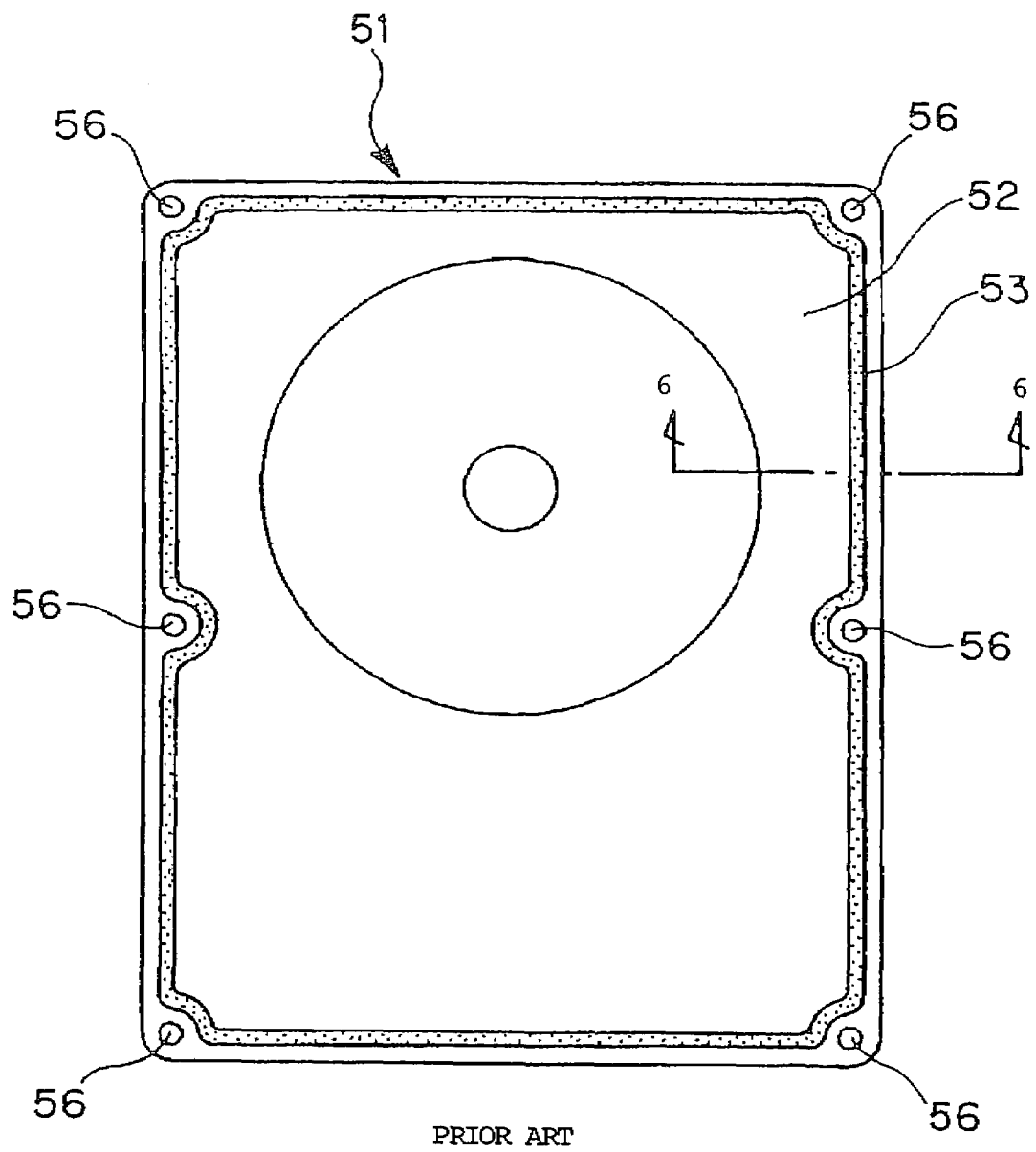
FIG. 5 is a plan view of a gasket in accordance with prior art.
Figure 6:
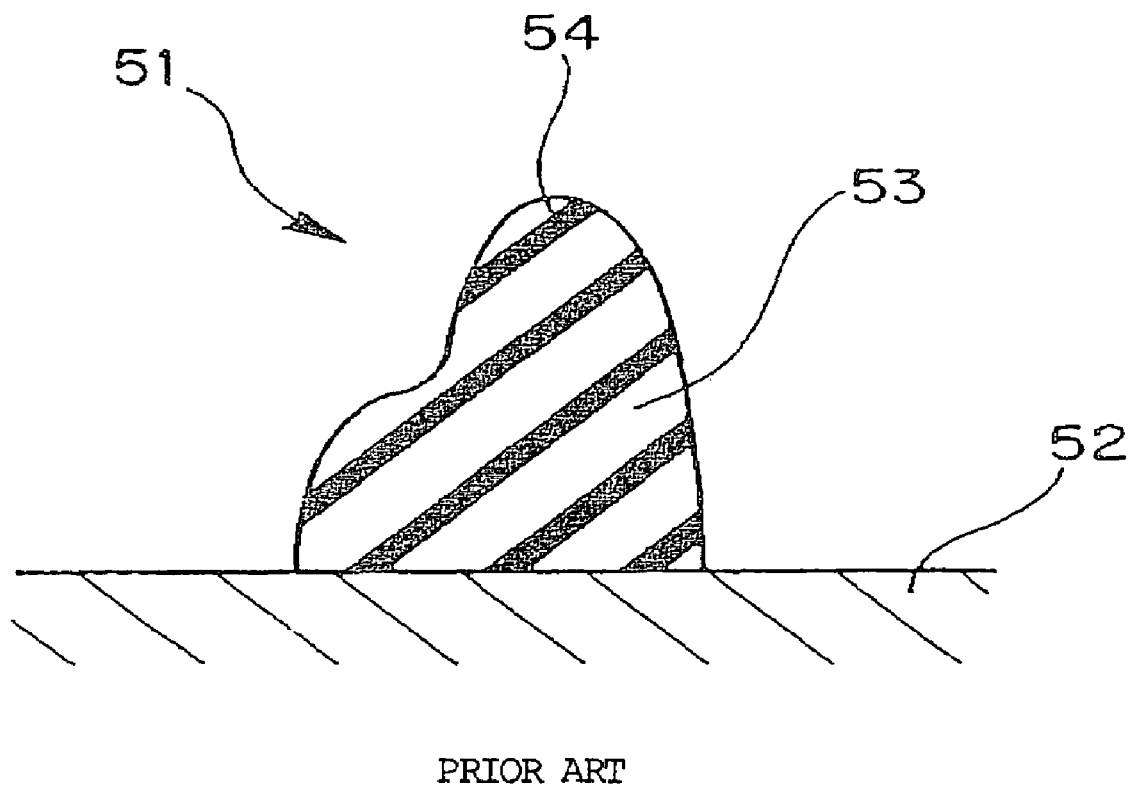
FIG. 6 is a cross sectional view of a main portion of the gasket and an enlarged cross sectional view along a line 6-6 in FIG. 5.
Figure 7:
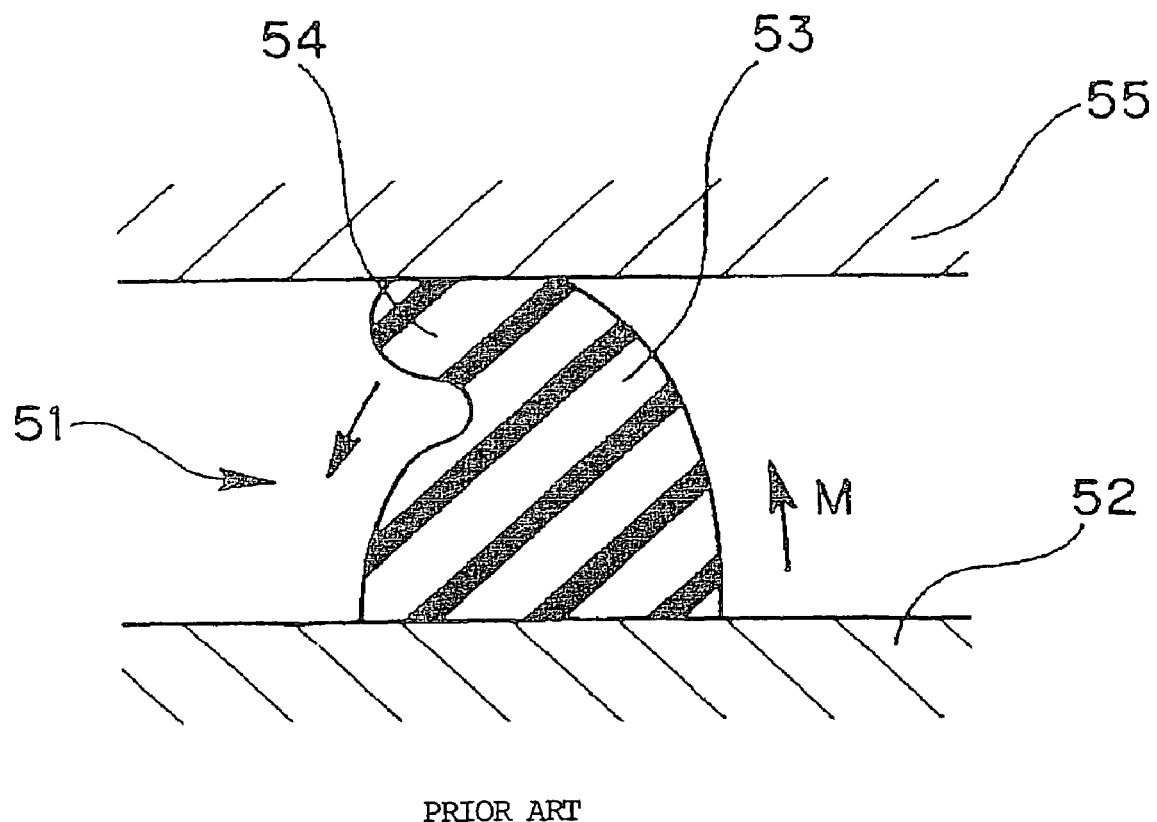
FIG. 7 is a cross sectional view of a main portion showing an assembled state of the gasket.

FIG. 1 shows a plan view of a gasket 1 in accordance with an embodiment of the present invention, and an enlarged cross section along a line 2-2 in FIG. 1 is shown in FIG. 2. Further, FIG. 3 is a cross sectional view of a main portion showing an assembled state of the gasket 1, and FIG. 4 is a cross sectional view of a main portion showing a manufacturing step of the gasket 1.

The gasket 1 in accordance with the embodiment is used as a cover gasket for a compact hard disc device, and is structured as follows.

First, as shown in FIG. 1, a cover plate 2 having an approximately rectangular shape in a plane surface is provided as a plate, and a packing 3 (called a gasket in a narrow definition) is firmly fixed to a peripheral edge portion of one surface of the cover plate 2 in an annular shape (an endless shape) with an illustrated predetermined plane arrangement.

The cover plate 2 is formed by press molding a raw material constituted by stainless steel, an aluminum alloy, a laminated material (structured by pinching a resin material having a thickness of about 20 to 50 μm by the stainless steel, the aluminum alloy or the like) or the like, or a raw material constituted by a laminated steel plate or the like, and a screw fixing portion 5 is provided as a screw hole for an assembling screw (not shown) in each of four corners of a plane surface thereof and the centers of the sides in a longitudinal direction, totaling six positions. The screw fixing portion 5 is provided for screw fastening the cover plate 2 to an opposing base plate (an actual device base) 4 corresponding to an opposing assembled member.

The packing 3 is formed by a rubber-like elastic material such as a fluorine rubber (FKM), an ethylene propylene diene rubber (EPDM), an acrylonitrile butadiene rubber (NBR), an acrylic rubber or the like, and a hardness thereof is set to about JIS Hs 20 to 80 (more preferably JIS Hs 40 to 65).

Further, in the packing 3, as shown in FIG. 2, since a lip portion 7 is provided in an upper portion of a base portion 6 in the packing 3 so as to be displaced toward an outer periphery (toward a right side in the drawing), a cross sectional shape of the packing 3 is formed in an asymmetrical shape in a width direction (a lateral direction in the drawing), and as shown in FIG. 3, the packing 3 is structured such that the lip portion 7 is compressed by the opposing base plate 4 at a time of assembling so as to be bent to an inner peripheral side (a left side in the drawing).

As mentioned above, an adhesion peeling tends to be generated in the packing 3 which is asymmetrical in the width direction, due to an influence of a bending moment (an arrow M) caused by the compression or the like, however, the following structure is provided as a countermeasure thereof in the gasket 1.

As shown in FIG. 1 mentioned above, a packing extension portion 9 is provided at a position close to the screw fixing portion 5 and in an inflection portion 8 in the plane surface shape of the packing 3 for partly enlarging an adhesive area of the packing 3 with respect to the cover plate 2. Further, the packing extension portion 9 is also provided in the other inflection portion 10 in the position close to the screw fixing portion 5 for enlarging the adhesive area of the packing 3 with respect to the cover plate 2. The inflection portions 8 and 10 correspond to a portion in which the packing 3 is bent, curved or crossed in the plane surface shape thereof.

The packing extension portion 9 is integrally formed as a rib-like structure in a side surface of the packing 3, and has a flush adhesion surface 9a with an adhesion surface 3a of the packing 3 with respect to the cover plate 2, thereby substantially enlarging the adhesive area of the packing with respect to the cover plate 2.

Further, the packing extension portion 9 is formed such that a size L in a longitudinal direction thereof is equal to or more than a width w1 of the adhesion surface 3a of the packing 3, and is formed such that a size w2 in a width direction is 20% or more of the width w1 of the adhesion surface 3a of the packing 3, thereby sufficiently enlarging the adhesive area.

Further, the packing extension portion 9 is formed such that a height h2 thereof is smaller than a height h1 of the packing 3 in an assembled state, whereby the packing extension portion 9 is not in contact with the opposing base plate 4 in the assembled state, so that the packing extension portion 9 is structured such that a seal performance of the gasket 1 is not affected.

Further, the gasket 1 is structured as an integrally formed type gasket in which the packing 3 is integrally formed on one surface of the cover plate 2 at a time of manufacturing, as shown in FIG. 4, and is structured such that a gasket forming material pouring hole 12 of a metal mold 11 at a time of integrally forming is arranged on a plane surface of the packing extension portion 9. Accordingly, as shown in FIG. 2 mentioned above, a pouring hole trace 13 is left on the plane surface of the packing extension portion 9.

The gasket 1 having the structure mentioned above is used as a top cover gasket in a compact hard disc device as mentioned above, and is characterized in that the following operations and effects can be achieved on the basis of the structure mentioned above.

First, the rib-like packing extension portion 9 is provided at the position close to the screw fixing portion 5 and in the inflection portion 8 in the plane surface shape of the packing 3 for partly enlarging the adhesive area of the packing 3 with respect to the cover plate 2, and the rib-like packing extension portion 9 is also provided in the other inflection portion 10 at a position close to the screw fixing portion 5 for enlarging the adhesive area of the packing 3 with respect to the cover plate 2, as mentioned above. Accordingly, the adhesive area of the packing 3 with respect to the cover plate 2 is enlarged in the position in which the packing extension portion 9 is provided, whereby the adhesive force is increased. Therefore, even if a comparatively large bending moment (an arrow M) caused by the screw fastening or the like is applied to the packing 3, it is possible to prevent the packing 3 from being peeled off from the cover plate 2 on the basis of the large adhesive force of the packing 3.

Further, since the gasket 1 is structured as the integrally formed type gasket in which the packing 3 is integrally formed on one surface of the cover plate 2 at a time of manufacturing, and the gasket forming material pouring hole 12 of the metal mold 11 at a time integrally forming the gasket is arranged on the plane surface of the packing extension portion 9, it is possible to prevent the pouring hole trace 13 corresponding to a kind of burr from negatively affecting the seal performance of the packing 3. The pouring hole trace 13 is arranged on the plane surface of the packing extension portion 9 as mentioned above, thereby being arranged at the position out of the seal line of the packing 3.

INDUSTRIAL APPLICABILITY

The present invention achieves the following effects.

Since the packing extension portion for partly enlarging the adhesive bonding area of the packing to the plate is provided in the position close to the screw fixing portion in the plane shape of the packing or the inflection portion or the position close thereto in the plane shape of the packing, in the gasket in accordance with the first aspect, the second aspect or the third aspect of the present invention provided with the structure mentioned above, the adhesive bonding area of the packing to the plate is enlarged in the position in which the packing extension portion is provided, and the adhesive force is increased. Accordingly, since the adhesive force of the packing is large, even if the comparatively large bending moment or the like is applied to the packing due to the fastening of the screw or the like, it is possible to effectively prevent the packing from being peeled off from the plate, whereby it is possible to maintain and improve the seal performance by the packing.

Further, in addition, in the gasket in accordance with the fourth aspect of the present invention provided with the structure mentioned above, since the gasket is constituted by the integrally formed gasket in which the packing is integrally formed in the plate, and the pouring hole of the gasket forming material of the metal mold at a time of integrally forming the gasket is arranged on the packing extension portion, it is possible to prevent the pouring hole trace left in the product from negatively affecting the seal performance by the packing, whereby it is possible to maintain and improve the seal performance by the packing.

Further, in the gasket in accordance with the fifth aspect of present invention provided with the structure mentioned above, since the gasket is used as the cover gasket for electronic equipment such as a hard disc device or the like, the packing is hard to be peeled off from the cover plate, whereby it is possible to provide the cover gasket for electronic equipment having a structure which is excellent in seal performance.

What is claimed is:

1. A gasket comprising a plate having a flat surface, said plate being screwed to an opposing assembly member at a screw fixing portion, and a packing bonded to a peripheral area on the flat surface of said plate in a predetermined pattern, said packing including:

a base portion bonded to the flat surface of said plate, a lip portion raised from said base portion and disposed at an outer peripheral side in a width direction of said packing, said lip portion being bent to an inner peripheral side of said plate when said lip portion is compressed by said opposing assembly member, and an extension portion extending from said base portion toward the outer peripheral side of said plate only near said screw fixing portion and an inflection portion of said packing, bottom surfaces of said base portion and said extension portion being contiguous on and bonded to the flat surface of said plate;

said base portion near said screw fixing portion and an inflection portion does not tend to be peeled off from said plate when said lip portion is bent due to said extension portion preventing said base portion from being peeled off from said plate.

2. The gasket as claimed in claim 1, wherein the packing is formed on the plate, and an elastic material left in a pouring hole of a mold used to form the packing forms a protrusion on top of the extension portion.

3. The gasket as claimed in claim 1, wherein said plate is used as a cover plate for electronic equipment.

* * * * *